United States Patent [19]

Heil

[11] Patent Number: 5,528,764
[45] Date of Patent: * Jun. 18, 1996

[54] BUS SYSTEM WITH CACHE SNOOPING SIGNALS HAVING A TURNAROUND TIME BETWEEN AGENTS DRIVING THE BUS FOR KEEPING THE BUS FROM FLOATING FOR AN EXTENDED PERIOD

[75] Inventor: Thomas F. Heil, Easley, S.C.

[73] Assignee: NCR Corporation, Dayton, Ohio

[*] Notice: The portion of the term of this patent subsequent to Feb. 21, 2012, has been disclaimed.

[21] Appl. No.: 996,277

[22] Filed: Dec. 24, 1992

[51] Int. Cl.$^6$ .................................... G06F 13/364
[52] U.S. Cl. .................... 395/293; 395/287; 364/242.6; 364/240.1; 364/243.41; 364/242.92
[58] Field of Search ................................ 395/425, 400, 395/325, 275

[56] References Cited

U.S. PATENT DOCUMENTS

| | | | |
|---|---|---|---|
| 4,161,024 | 6/1979 | Joyce et al. | 364/200 |
| 4,933,835 | 6/1990 | Sachs et al. | 364/200 |
| 5,067,078 | 11/1991 | Talgam et al. | 395/400 |
| 5,072,369 | 12/1991 | Theus et al. | 395/425 |
| 5,109,493 | 4/1992 | Banerjee | 395/325 |
| 5,249,284 | 9/1993 | Kass et al. | 395/425 |
| 5,276,887 | 1/1994 | Haynie | 395/725 |
| 5,335,335 | 8/1994 | Jackson et al. | 395/425 |
| 5,392,407 | 2/1995 | Heil et al. | 395/325 |

Primary Examiner—Thomas C. Lee
Assistant Examiner—Marc K. Weinstein
Attorney, Agent, or Firm—George Gates

[57] ABSTRACT

A Peripheral Component Interconnect (PCI) bus for component level interconnection of processors, peripherals and memories. The PCI bus is a physical interconnect apparatus intended for use between highly integrated peripheral controller components and processor/memory systems. The PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations. The PCI bus lends itself to use as a main memory bus, and can be used with various cache memory techniques.

16 Claims, 11 Drawing Sheets

BUS SYSTEM WITH CACHE SNOOPING SIGNALS HAVING A TURNAROUND TIME BETWEEN AGENTS DRIVING THE BUS FOR KEEPING THE BUS FROM FLOATING FOR AN EXTENDED PERIOD

BACKGROUND OF THE INVENTION

1. Cross-Reference to Related Applications

This application is related to:

Application Ser. No. 07/997,427, entitled "Peripheral Component Interconnect 'Always On' Protocol," filed on same date herewith by T. Heil, and assigned to the assignee of this application, still pending;

Application Ser. No. 07/996,278, entitled "Peripheral Component Interconnect Special Cycle Protocol Using Soft Message IDs," filed on same date herewith by T. Heil, and assigned to the assignee of this application, still pending; and Application Ser. No. 07/996,276, entitled "Multi-Port Processor With Peripheral Component Interconnect Port and RAMBUS Port," filed on same date herewith by T. Heil et al. and assigned to the assignee of this application, now U.S. Pat. No. 5,392,407.

All of the above-identified applications are incorporated by reference herein.

2. Field of the Invention

This invention relates in general to computer input/output (I/O) device interfaces, and in particular to a computer I/O bus.

3. Description of Related Art

A communications interface or input/output bus is typically used in computer systems to interconnect separate devices, such as processors, memories, and peripherals. Standardized interfaces such as the ISA, EISA, or Micro Channel™ buses have long been used in computer systems to provide a common I/O board interface across different platforms and different processor generations. However, there are a number of problems associated with these interfaces.

The main problem with these prior interfaces involves cost. Most performance critical peripherals are being moved to motherboards, not only for the performance advantages of processor proximity and minimal interconnect length, but also to leverage the cost and space advantages of higher levels of integration. However, complete integration with the resultant cost and space savings is hampered by lack of a standard component interconnect and the necessity of "glue logic" to connect to the variety of processors and peripheral devices to buses.

Another problem with these prior interfaces involves performance constraints. Standard I/O expansion buses are performance limiting, due to general access latency and the severe bandwidth constraints felt by high performance devices, particularly graphics devices and future communication devices such as fiber LANs.

Further, as highly integrated, performance critical peripheral controllers migrate closer to the processor, there is significant pressure to put them on the "processor treadmill." In other words, these parts are under pressure to track the frequent changes in processor bus frequencies, widths, protocols (e.g., bursting), and signalling standards (e.g., 3 volts). Unnecessarily placing peripheral parts on this treadmill increases system costs and delays the availability of leading edge systems.

Still another problem with prior interfaces involves reliability. As the industry moves toward distributed processing, client systems will become a reliability burden (the weak link) in distributed systems, and therefore will be under pressure to offer levels of reliability and fault containment previously reserved for larger server systems.

SUMMARY OF THE INVENTION

To overcome the limitations in the prior art described above, and to overcome other limitations that will become apparent upon reading and understanding the present specification, the present invention discloses a Peripheral Component Interconnect (PCI) bus for component level interconnection of processors, peripherals and memories. The PCI bus is a physical interconnect apparatus intended for use between highly integrated peripheral controller components and processor/memory systems. The PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations. The PCI bus lends itself to use as a main memory bus, and can be used with various cache memory techniques. The PCI bus results in several benefits which will become readily apparent upon an understanding of the features of the present invention, and the advantages that derive therefrom.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Introduction

The present application describes several inventive features of an interface or bus for computer systems termed the Peripheral Component Interconnect (PCI). A more complete discussion of the PCI bus is available in the document *Peripheral Component Interconnect (PCI), Revision 1.0 Specification,* Jun. 22, 1992, incorporated by reference herein.

A PCI bus is a physical interconnect apparatus intended for use between highly integrated peripheral controller components and processor/memory systems. A PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations.

The specification for the PCI bus is intended to standardize a local bus on which a large variety of I/O components can directly connect without "glue" logic, i.e., direct component interconnection. The goal of direct component interconnection results in several advantages:

Electrical driver and frequency specifications within the reach of ASICs and other VLSI devices.

Cost decreases and reliability enhancements due to a lower parts count, smaller power budget, and higher density packaging.

Performance advantages due to a high speed local bus.

A system I/O core design decoupled from the processor/memory treadmill, thus allowing it to survive multiple generations of processor/memory technology.

A manageable protocol providing a large variety of I/O functions with a common physical interface.

The PCI bus includes a protocol mechanism that guarantees that at all times (except for turn-around clocks necessary to prevent contention), the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

System Description

Figure 1:
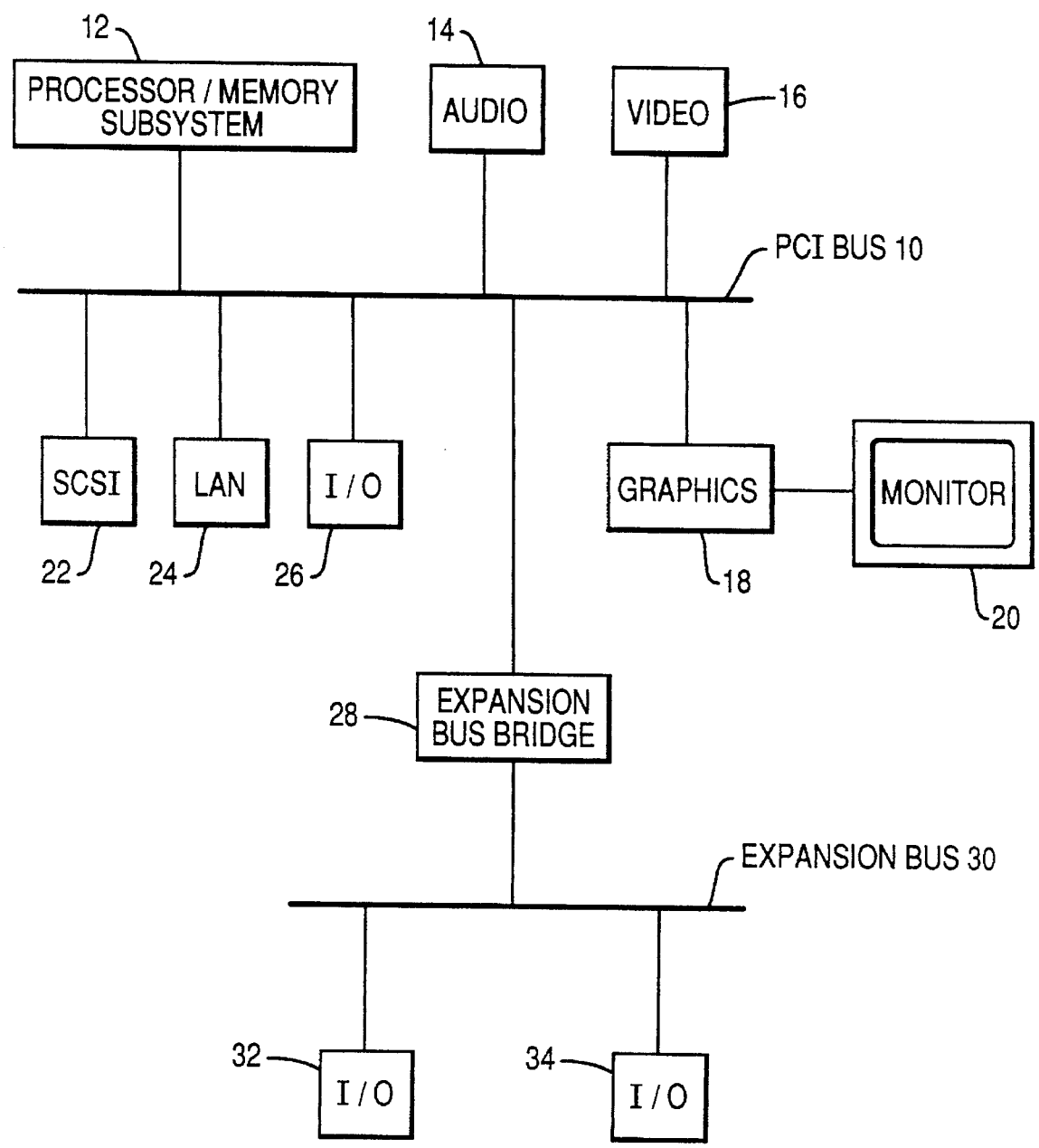
FIG. 1 is a block diagram of an example configuration using the PCI bus.

FIG. 1 is a block diagram of an example configuration using the PCI bus 10. A processor/memory subsystem 12 is coupled to the PCI bus 10, as are such peripherals as audio boards 14, video boards 16, video graphics controllers 18 for monitors 20, SCSI peripherals 22, LAN interfaces 24, and other I/O devices 26. Bridge interface logic 28 couples the PCI bus 10 to a standard expansion bus 30 and provides access therebetween for various expansion I/O boards 32, 34. Those skilled in the art will recognize that this example configuration is not intended to imply any specific architectural limits.

In the present invention, a processor/memory subsystem 12 may directly access peripheral devices mapped anywhere in the memory or I/O address spaces via a PCI bus 10. Components connected to the PCI bus 10 may be any one of three classes: master, slave, or master-slave combination. Provided these components are all compliant with the PCI specification, the PCI bus 10 becomes a VLSI interconnect, with no "glue" logic necessary. However, if it is necessary to attach components to the bus that are not compliant with the PCI specification, then specialized logic devices can be used to make the connection to the PCI bus.

Signal Definition

Figure 2:
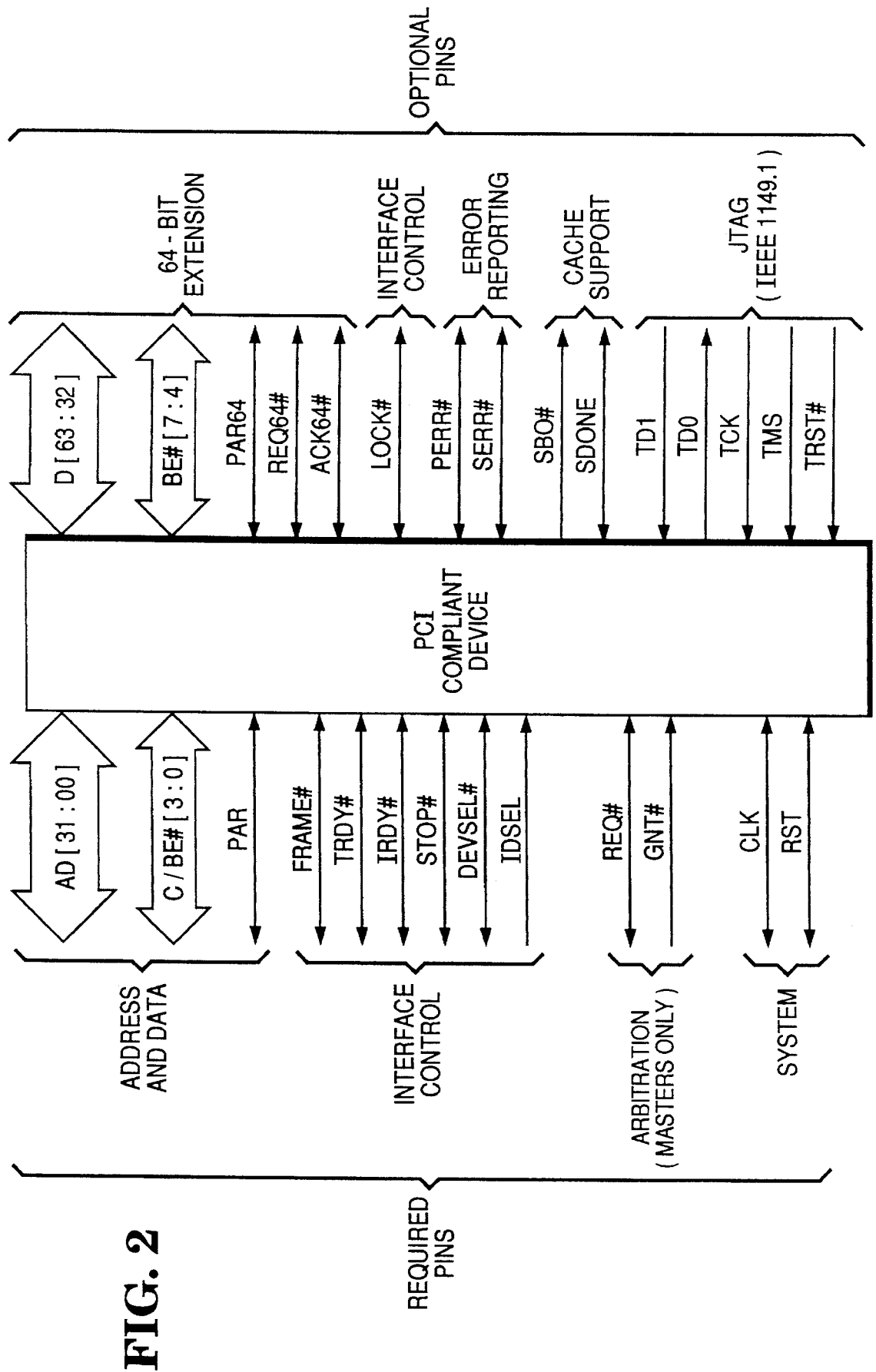
FIG. 2 illustrates the signal definitions of the PCI bus according to the present invention.

FIG. 2 illustrates the signal definitions of the PCI bus according to the present invention. The PCI bus requires a minimum of 45 pins for a slave-only device and 47 pins for a master-only or master-slave device to handle data and addressing, interface control, arbitration, and system functions. Optional error reporting requires two additional pins. The pins in FIG. 2 are shown in functional groups, with required pins on the left side and optional pins on the right side. The direction indication on the signals in FIG. 2 assumes a combination master-slave device. A selected subset of the signals are described below in more detail. For more information on the other signals, refer to the document *Peripheral Component Interconnect (PCI), Revision 1.0 Specification,* Jun. 22, 1992, incorporated by reference herein.

Note that there are certain conventions to the signal names defined below:

1. The # symbol at the end of a signal name indicates that the active state occurs when the signal is at a low voltage; otherwise, the signal is active at a high voltage.
2. The "(in)" symbol indicates a standard input-only signal.
3. The "(out)" symbol indicates a totem pole output, i.e., a standard active driver.
4. The "(t/s)" symbol indicates a tri-state signal, i.e., a bi-directional, tri-state, input/output signal.
5. The "(s/t/s)" symbol indicates a sustained tri-state signal, i.e., an active low tri-state signal owned and driven by one device at a time. The device that drives a (s/t/s) signal low must drive it high for at least one clock before letting it float. A new device cannot start drive a (s/t/s) signal any sooner than one clock after the previous owner tri-states it. A pull-up is required to sustain the inactive state until another device drives it, and must be provided by a central resource.

System Signals

CLK (in)

The CLK (Clock) signal provides timing for all transactions on the PCI bus and is an input to every device. All other PCI bus signals are sampled on the rising edge of the CLK signal, and all other timing parameters are defined with respect to this edge. It is expected that the PCI bus may operate over a wide range of frequencies for the CLK signal.

AD[31::00] (t/s)

The AD (Address and Data) signals are multiplexed on the same pins of the PCI bus. During the first clock of a transaction, the AD signals contain a 32-bit target device address. During subsequent clocks, the AD signals contain up to 4 bytes of data.

C/BE#[3::0] (t/s)

The C/BE (Bus Command and Byte Enable) signals are multiplexed on the same pins of the PCI bus. During the address phase of a transaction, the C/BE# signals define a bus command. During the data phase of the transaction, the C/BE# signals are used as "Byte Enables" for the 32 AD signals. The Byte Enables determine which byte lanes, i.e., 8-bit groups, of the AD signals carry meaningful data. For example, the C/BE#[0] signal applies to byte 0 of the AD signals, and the C/BE#[3] signal applies to byte 3 of the AD signals.

Interface Control Signals

FRAME# (s/t/s)

The FRAME# (Cycle Frame) signal is driven by the current master device to indicate the beginning and duration of an access. The FRAME# signal is asserted to indicate a bus transaction is beginning. While the FRAME# signal is asserted, data transfers continue. When the FRAME# signal is de-asserted, the transaction is in the final data phase.

TRDY# (s/t/s)

The TRDY# (Target Ready) signal indicates the target device's ability to complete the current data phase of the transaction. The TRDY# signal is used in conjunction with the IRDY# signal described below. A data phase is completed on any clock where both the TRDY# and IRDY# signals are asserted. During a read, the TRDY# signal indicates that valid data is present on the AD signals. During a write, the TRDY# signal indicates that the target device is prepared to accept data. Wait cycles are inserted until both the IRDY# and TRDY# signals are asserted together.

IRDY# (s/t/s)

The IRDY# (Initiator Ready) signal indicates the initiating device's (master device's) ability to complete the current data phase of the transaction. The IRDY# signal is used in conjunction with the TRDY# signal. A data phase is completed on any clock that both the IRDY# and TRDY# signals are asserted. During a write, the IRDY# signal indicates that valid data is present on the AD signals. During a read, the IRDY# signal indicates that the master device is prepared to accept data. Wait cycles are inserted until both the IRDY# and TRDY# signals are asserted together.

STOP# (s/t/s)

The STOP# signal indicates the current target is requesting the master device to stop the current transaction.

LOCK# (s/t/s)

The LOCK# signal is an optional signal that indicates an atomic operation that may require multiple transactions to complete. When LOCK# is asserted, nonexclusive transactions may proceed. A grant to start a transaction on PCI does not guarantee control of LOCK#. Control of LOCK# is obtained under its own protocol in conjunction with GNT#. It is possible for different devices to use PCI while a single master device retains ownership of LOCK#.

IDSEL (in)

The IDSEL (Initialization Device Select) signal is used as a chip select in lieu of the upper 24 address lines during configuration read and write transactions.

DEVSEL# (s/t/s)

The DEVSEL (Device Select) signal, when actively driven, indicates that the driving device has decoded its address as the target device for the current transaction. As an input, the DEVSEL# signal indicates whether any device on the bus has been selected.

Arbitration (master devices only)

REQ# (out)

The REQ# (Request) signal indicates to a central bus arbiter that the device desires use of the bus. The REQ# signal is a point-to-point signal, and every master device and master-slave device has its own REQ# signal connection with the arbiter.

GNT# (in)

The GNT# (Grant) signal indicates to the device that access to the bus has been granted by the arbiter. The GNT# signal is a point-to-point signal, and every master device and master-slave device has its own GNT# signal connection with the arbiter.

Basic Transaction Control

In order to minimize access latency, the PCI specification uses an arbitration approach to bus transactions the is access-based, rather than time-slot-based. Thus, a master device must arbitrate for each access it performs on the bus.

Preferably, a central arbitration scheme is used, wherein each master device has a unique request (REQ#) and grant (GNT#) signal connected to the central arbiter device. A simple request-grant handshake between the arbiter and the master device is used to gain access to the bus.

A specific arbitration algorithm must be implemented by the arbiter, e.g., priority, rotating priority, fair, etc. An arbitration algorithm must be defined to establish a basis for a worst case latency guarantee. The arbitration occurs during a previous access so that no PCI bus cycles are consumed due to arbitration algorithm. The arbiter can implement any scheme as long as only a single GNT# is asserted on any clock.

A device requests the bus by asserting its REQ# signal. When the arbiter determines a device may use the bus, it asserts the device's GNT# signal. The arbiter may de-assert a device's GNT# signal on any clock. Therefore, a device must insure its GNT# is asserted on the clock edge it wants to start a transaction. If the GNT# signal is de-asserted, then the transaction must not proceed.

The GNT# signal normally gives a device access to the bus for a single transaction. If the device desires another access, it should continue to assert its REQ# signal. A device may de-assert its REQ# signal anytime, but the arbiter may interpret this to mean the device no longer requires use of the bus and may de-assert the device's GNT# signal.

The PCI bus may use "arbitration parking," wherein the arbiter asserts the GNT# signal to a selected device when no device is currently using or requesting the bus. The arbiter can select this default owner any way it wants (e.g., fixed, last used, etc.) or can choose not to park at all, thereby effectively designating itself as the default owner. When the arbiter asserts a device's GNT# signal and the bus is idle, that device must enable its AD and C/BE# signal buffers. This requirement insures the arbiter can safely park the bus at some device and know that the bus will not float. If the arbiter does not park the bus, the central resource device in which the arbiter is embedded typically drives the bus, i.e., effectively designating the central resource device as the default owner of the bus.

If the bus is idle and the arbiter de-asserts a device's GNT# signal, the device has lost access to the bus, except in one case. The one case is when the arbiter de-asserts the GNT# signal coincident with the device asserting the FRAME# signal. In this case, the device will continue the transaction. Otherwise, the device must tri-state the AD and C/BE# signals. The device must disable all buffers in a single clock to avoid possible contention with the next bus owner.

After bus ownership has been granted to a master device, the FRAME# signal is asserted by being driven to a low voltage by the master device to indicate the beginning of the transaction. The first clock edge on which the FRAME# signal is asserted is the address phase, and the address and bus command code are transferred by the AD and C/BE# signals on that clock edge. The next clock edge begins the first of one or more data phases, during which data is transferred by the AD signals between the master device and the target device on each clock edge for which both the IRDY# and TRDY# signals are asserted by the master device and the target device, respectively. Wait cycles may be inserted in a data phase by either the master device or the target device with the IRDY# and TRDY# signals.

At such time as the master device intends to complete only one more data transfer (which could be immediately after the address phase), the FRAME# signal is de-asserted and the IRDY# signal is asserted indicating the master device is ready. After the target device indicates the final data transfer, by asserting the TRDY# signal, the PCI bus returns to the idle state with both the FRAME# and IRDY# signals de-asserted.

Bus Driving and Turnaround

A turn-around-cycle is required on all signals that may be driven by more than one device. The turn-around-cycle is required to avoid contention when one device stops driving a signal and another device begins, and must last at least one clock. This is indicated on the timing diagrams of FIGS. 3 and 4 as two arrows pointing at each others' tail. This turn-around-cycle occurs at different times for different signals. For example, the IRDY#, TRDY# and DEVSEL# signals use the address phase as their turn-around-cycle, while the FRAME#, C/BE# and AD signals use the idle cycle between transactions as their turn-around-cycle. An idle cycle occurs when both the FRAME# and IRDY# signals are de-asserted.

All of the AD signals must be driven to stable values during every address and data phase. In addition, byte lanes of the AD signals not involved in a current data transfer must physically drive stable (albeit meaningless) data onto the bus. The motivation is to keep input buffers on byte lanes not involved in the transfer from switching at the threshold level, and more generally, to facilitate fast metastability free latching. In the interest of minimizing bus switching power consumption, byte lanes not being used in the current bus phase should be driven with the same data as contained in the previous bus phase. The output buffers may have a built-in latch or dynamic flip-flop to capture that data from clock to clock.

Read Transaction

Figure 3:
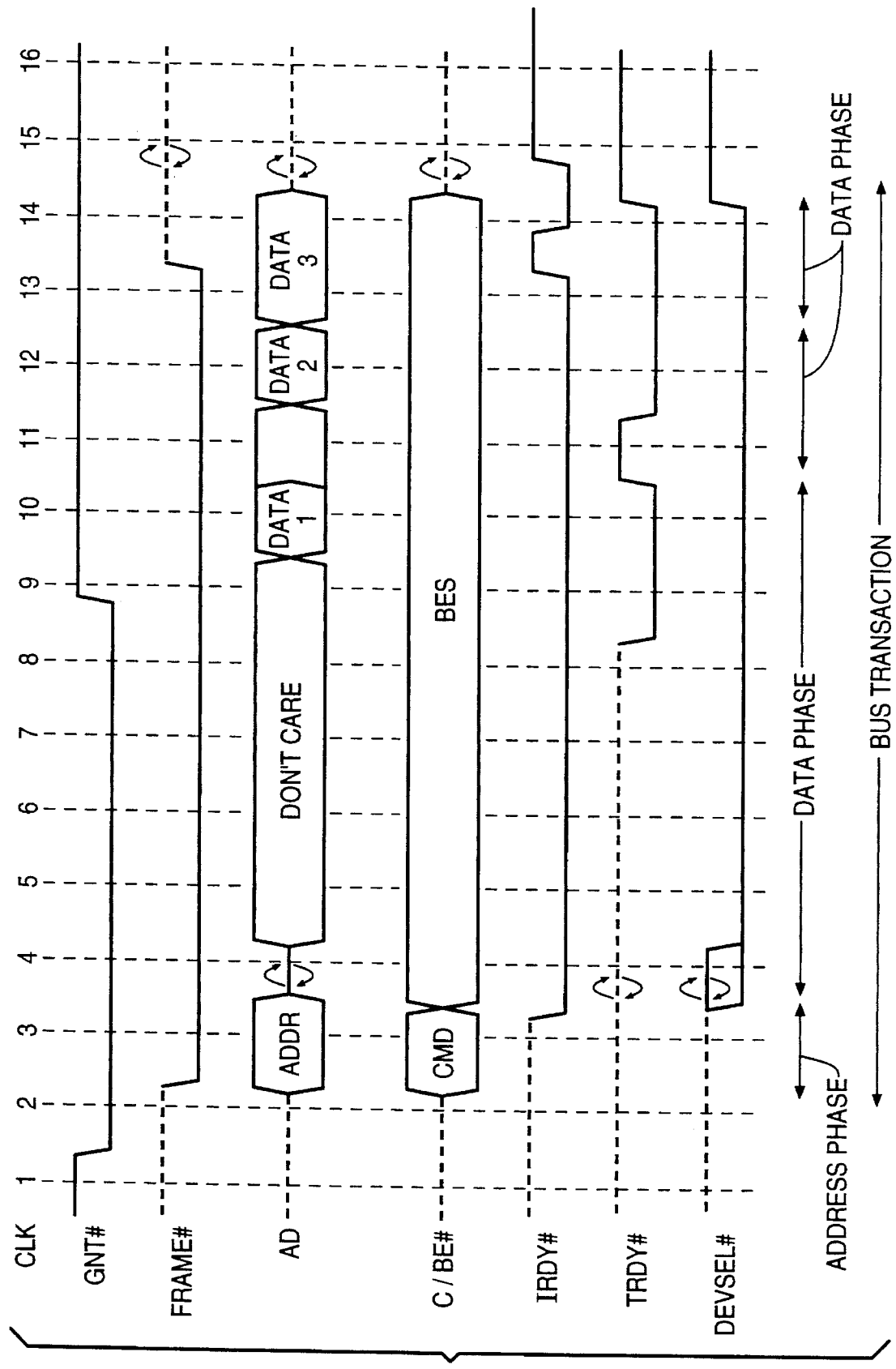
FIG. 3 illustrates a read transaction on the PCI bus.

FIG. 3 is a timing diagram illustrating a read transaction on the PCI bus. The master device must enable its AD and C/BE# signal drivers when it is granted bus ownership, i.e., after the GNT# signal is asserted by the arbiter. The read transaction starts with an address phase which occurs when the FRAME# signal is asserted for the first time and occurs in clock period 2. The AD signals contain a target device address and the C/BE# signals contain a bus command.

A turn-around-cycle occurs in clock period 3 to avoid contention when the master device stops driving the AD signals and the target device begins driving the AD, TRDY#, and DEVSEL# signals. This is indicated on the timing diagram of FIG. 3 as two arrows pointing at each others' tail. The turn-around-cycle lasts from clock period 3 until clock period 4. The target device must enable its AD signal drivers at clock period 4, as soon as it decodes an address identifying itself as the selected target device of the current cycle, even though it may not supply the requested data on the AD signals for some time. This ensures that, if the bus is stalled waiting for a slow target device to drive requested data onto the bus, that the AD signals are not allowed to float.

The earliest the target device can provide valid data is clock period 9, as enforced by the target device via the TRDY# signal. During the data phase, the C/BE# signals indicate which byte lanes are involved in the current data phase. The C/BE# signal buffers must remain enabled regardless of whether data is transferred to ensure that they are not left floating.

A data phase completes when data is transferred, which occurs when both the IRDY# and TRDY# signals are asserted on the same clock edge. When either signal is de-asserted, a wait cycle is inserted and no data is transferred. As noted in the diagram, data is successfully transferred on clock edges 10, 12, and 14, and wait cycles are inserted on clock edges 11, and 13. The first data phase completes in the minimum time for a read transaction, i.e., from clock edge 9 through clock edge 10. The second data phase is extended on clock edge 11 because the TRDY# signal is de-asserted by the target device to force a wait cycles. The last data phase is extended on clock edge 13 because the IRDY# signal is de-asserted by the master device to force a wait cycle.

The master device knows at clock edge 14 that the next data phase is the last. However, because the master device is not ready to complete the last transfer when the IRDY# signal is de-asserted on clock 13, the FRAME# signal stays asserted. Only when the IRDY# signal is asserted on clock edge 14 can the FRAME# signal be de-asserted, which occurs on clock edge 14.

Write Transaction

Figure 4:
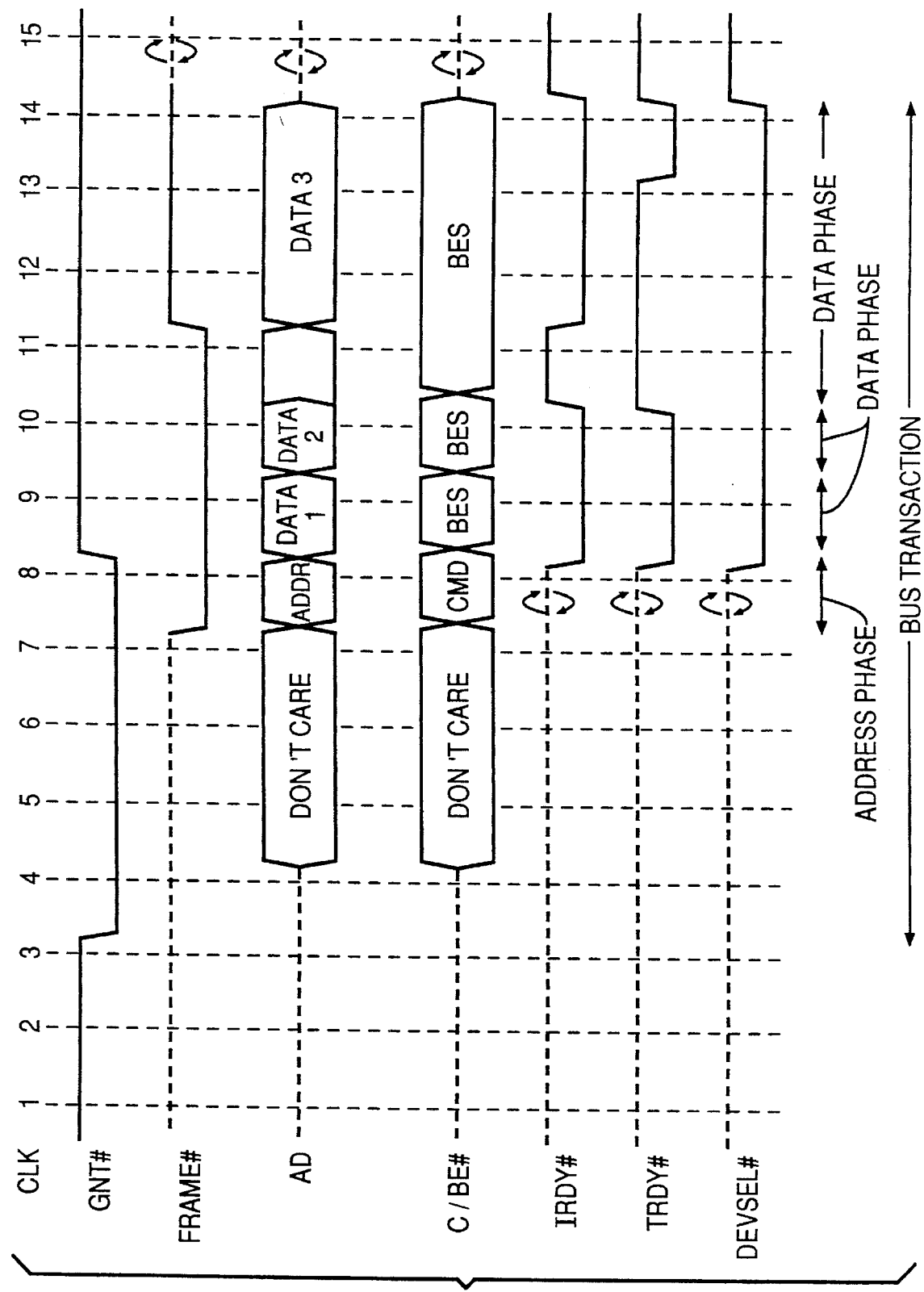
FIG. 4 illustrates a write transaction on the PCI bus.

FIG. 4 is a timing diagram illustrating a write transaction on the PCI bus. The master device must enable its AD and C/BE# signal drivers when it is granted bus ownership, i.e., when the GNT# signal is asserted by the arbiter. The write transaction starts with an address phase which occurs when the FRAME# signal is asserted for the first time on clock edge 8 at which time the AD signals contain a target device address and the C/BE# signals contain a bus command. A write transaction is similar to a read transaction except that no turn-around-cycle is required following the address phase because the master device drives the AD and C/BE# signals for the entire transaction.

The data phases work the same as in the read transaction. The first and second data phase complete with no wait cycles. However, the third data phase has three wait cycles inserted by the target device. Both devices insert a wait cycle on clock edge 11, and the target device inserts wait cycles on clock edges 12 and 13.

The IRDY# signal must be asserted when the FRAME# signal is de-asserted indicating the last data phase. The data transfer is delayed by the master device on clock edge 11 because the IRDY# signal is de-asserted. Although this allows the master device to delay data, it does not allow the Byte Enables of the AD signals to be delayed. The last data phase is signaled by the master device on clock edge 12, but does not complete until clock edge 14.

Transaction Termination

Termination of a transaction may be initiated by either the master device or the target device. While neither can actually stop the transaction unilaterally, the master device remains in ultimate control, bringing all transactions to an orderly and systematic conclusion regardless of what caused the termination. All transactions are concluded when the FRAME# and IRDY# signals are both de-asserted, thereby indicating an idle cycle.

Because arbitration has occurred during the transaction, the arbiter asserts the GNT# signal to the next selected device before the end of the current transaction. The next selected device waits for the de-assertion of the FRAME# and IRDY# signals to indicate the end of the transaction. At that time, the next selected device must enable its AD and C/BE# signal buffers, thereby ensuring that the bus will not float. Thus, the GNT# signal provides a device with access to the bus for only a single transaction. If the device desires further access to the bus for another transaction, it should continue to assert its REQ# signal for service again by the arbiter.

Concurrent Architectures

Figure 5A:
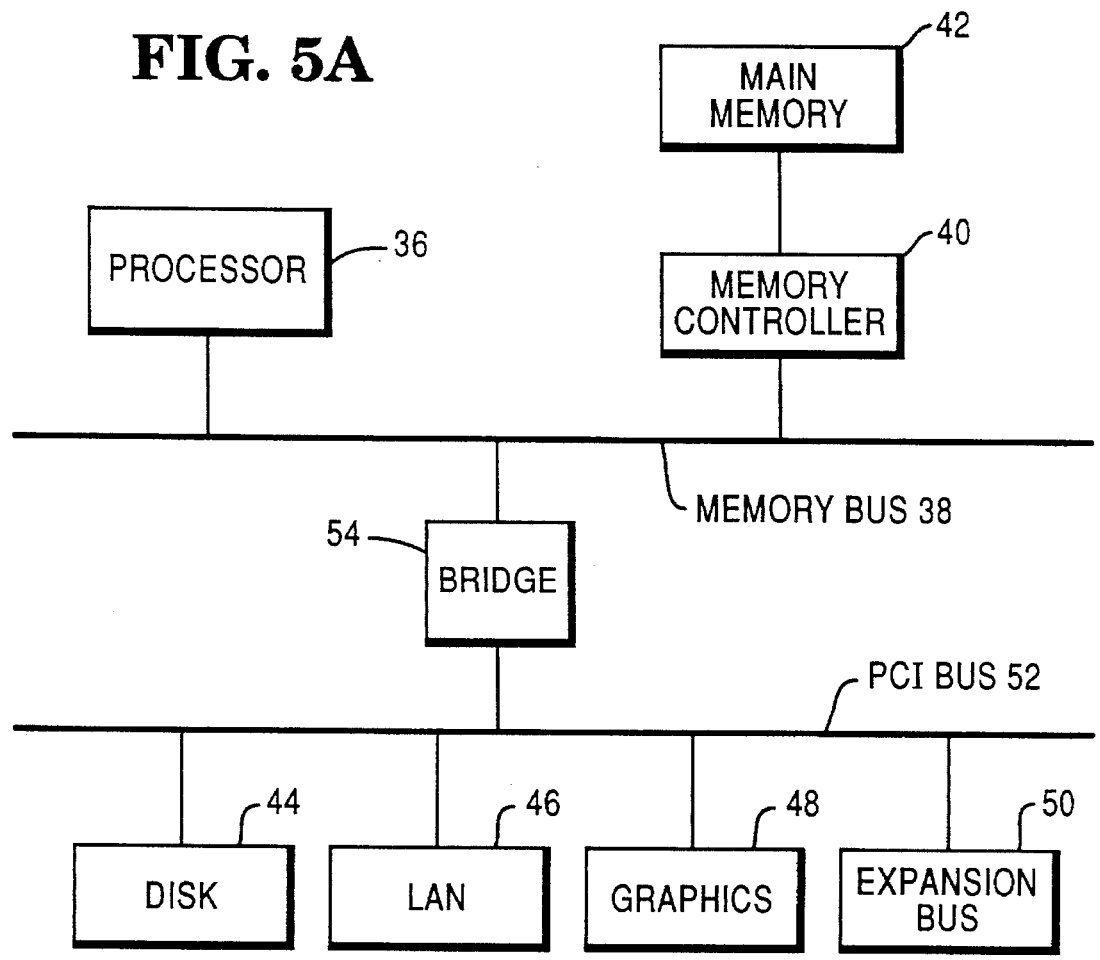
FIGS. 5A–5C illustrate some example concurrent architectures using the PCI bus for peer-to-peer I/O operations.
Figure 5B:
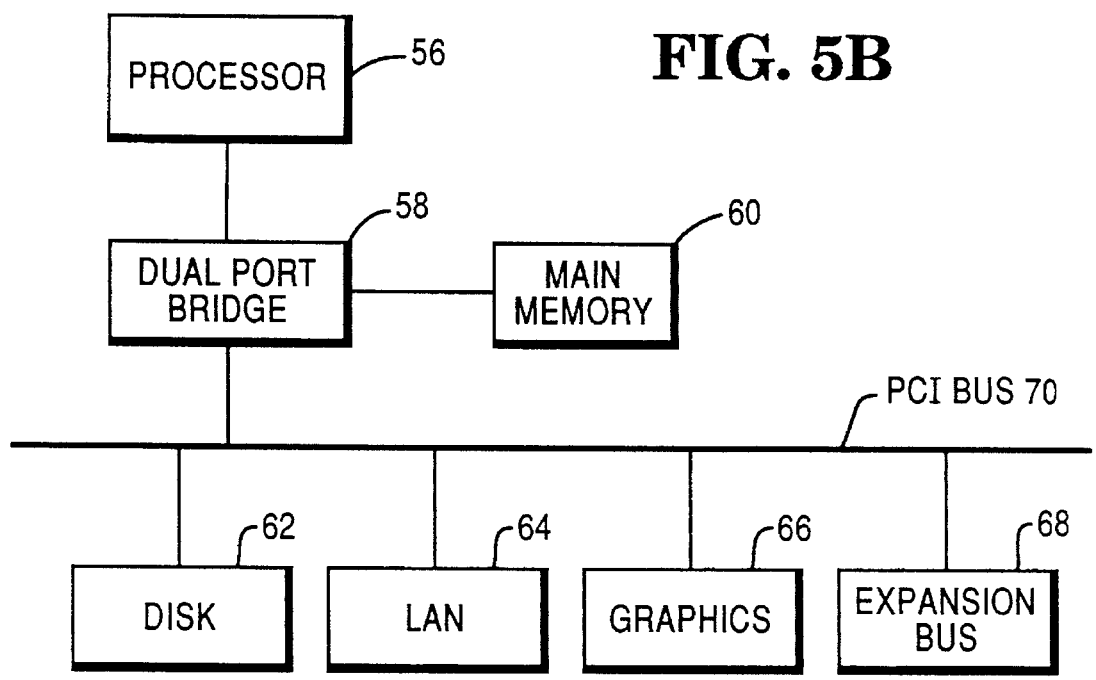
Figure 5C:
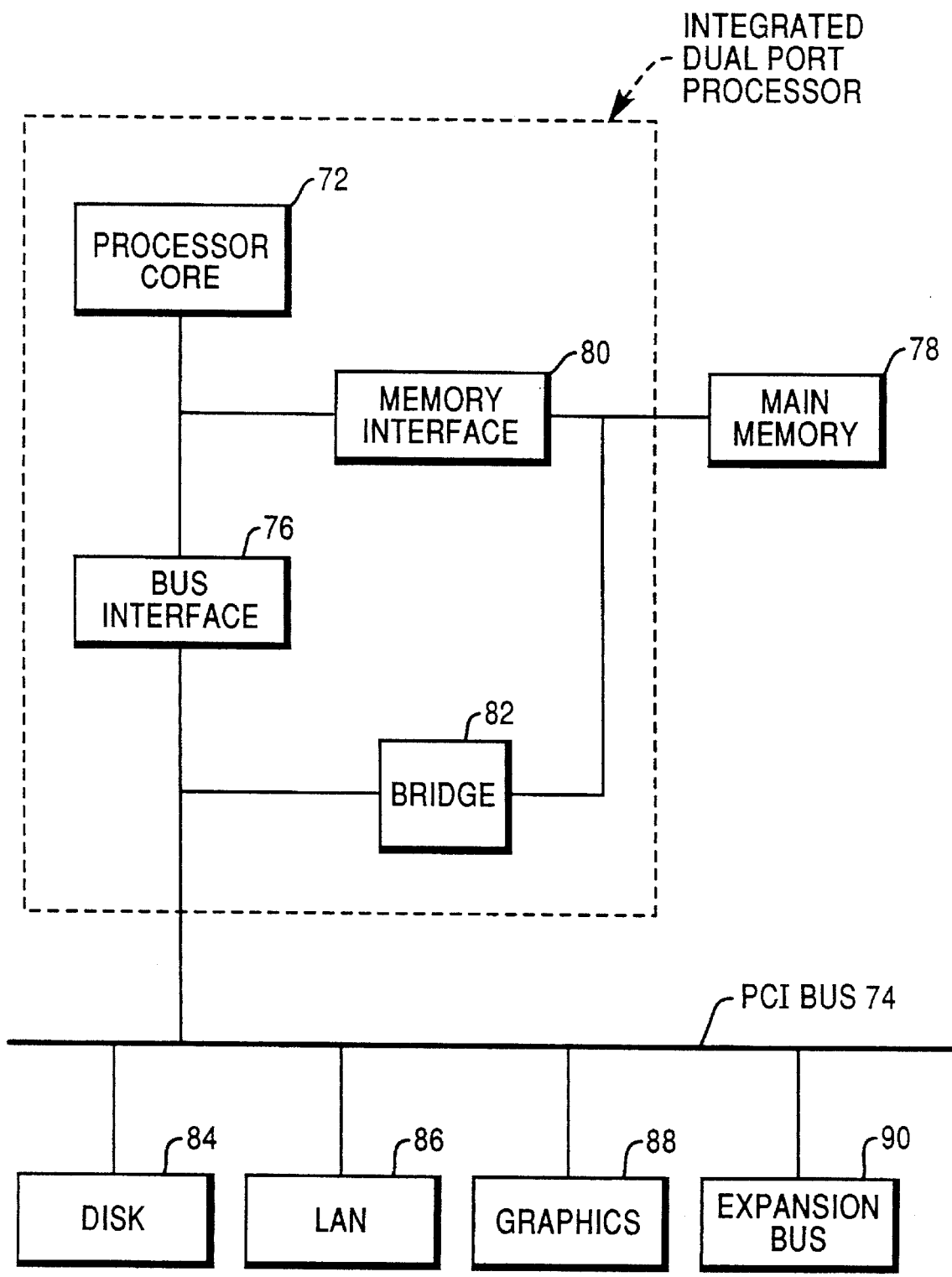

FIGS. 5A–5C illustrate some example concurrent architectures using the PCI bus for peer-to-peer I/O operations.

Those skilled in the art will recognize that these example configurations are not intended to imply any specific architectural limits.

The PCI specification is optimized for emerging high-performance desk top applications, e.g., those applications requiring high throughput I/O, such as real-time full-motion audio and video, video conferencing, etc. In such applications, the PCI bus acts as a true, concurrent I/O bus in that peer-to-peer I/O operations between peripherals on the PCI bus are concurrent with processor accesses to and from main memory.

FIG. 5A depicts a traditional concurrent architecture with memory and I/O buses separated by a bridge. A processor 36 is coupled to the memory bus 38, along with a memory controller 40 which provides access to main memory 42. A number of different peripherals, e.g., disk 44, LAN interface 46, graphics card 48, and expansion bus 50, are coupled to a PCI bus 52. Bridge interface logic 54 couples the PCI bus 53 to the memory bus 38 and provides access therebetween.

FIG. 5B depicts a concurrent architecture with a dual-port bridge. A processor 56 is coupled to bridge interface logic 58 along with main memory 60, wherein the bridge interface logic 58 also comprises a memory controller for providing access to the main memory 60. A number of different peripherals, e.g., disk 62, LAN interface 64, graphics card 66, and expansion bus 68, are also coupled to a PCI bus 70. The bridge interface logic 58 couples the PCI bus 70 to the processor 56 and main memory 60, and provides access therebetween.

FIG. 5C depicts a concurrent architecture with a high-integration dual-port processor. A processor 72 is coupled to a PCI bus 74 via bus interface logic 76, and is coupled to a main memory 78 via memory interface logic 80, which acts as a memory controller. The main memory 78 also couples to the PCI bus 74 via bridge interface logic 82, and provides access therebetween. A number of different peripherals, e.g., disk 84, LAN interface 86, graphics card 88, and expansion bus 90, are also coupled to the PCI bus 74.

Main Memory Bus Architectures

Figure 6A:
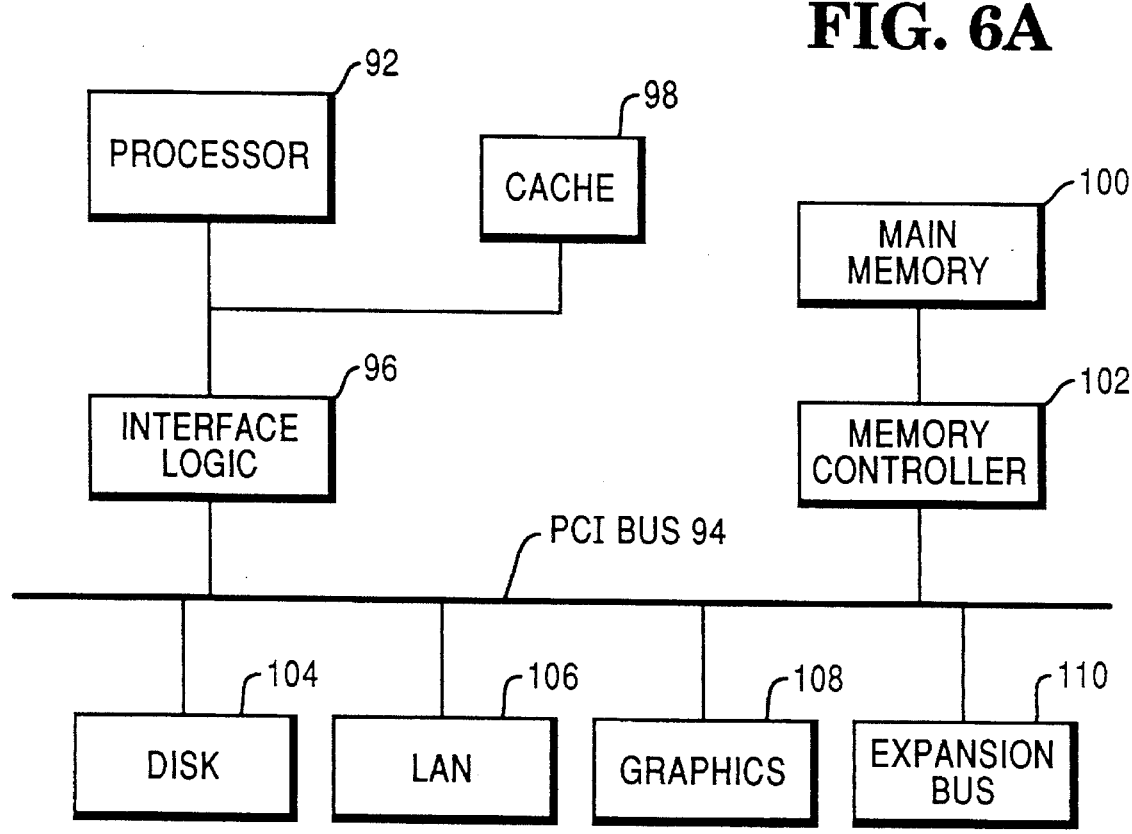
FIGS. 6A–6C illustrate some example architectures using the PCI bus as a main memory bus.
Figure 6B:
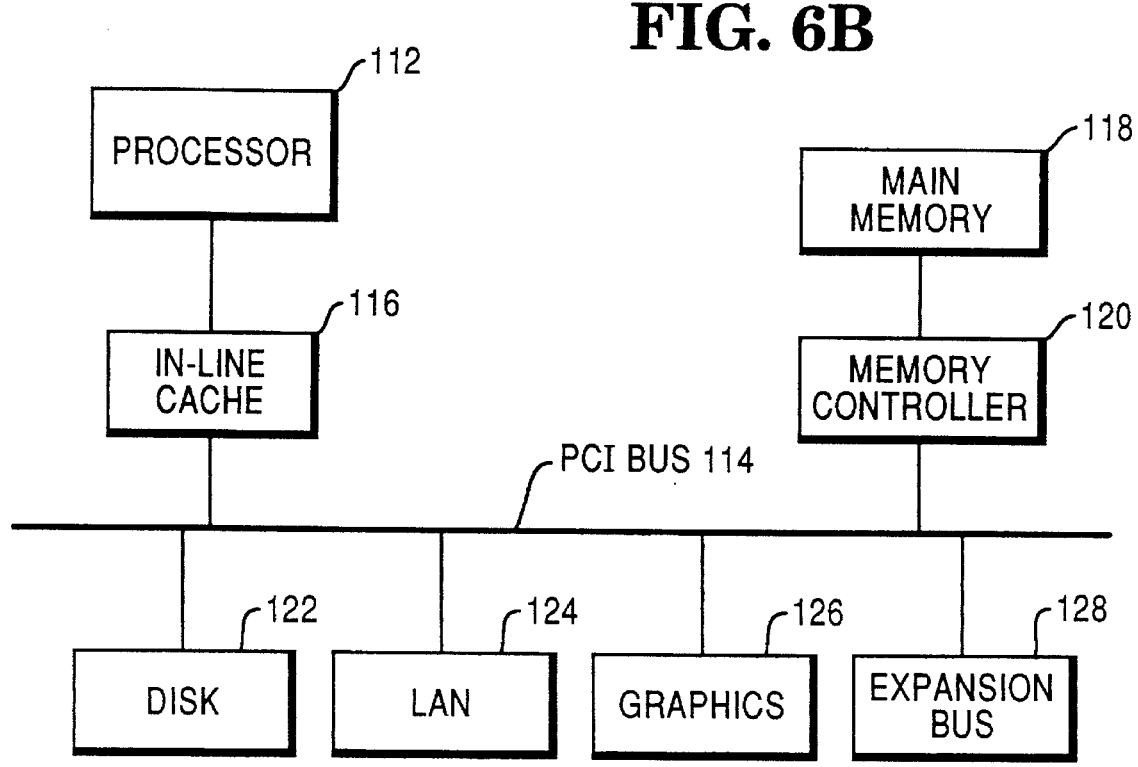
Figure 6C:
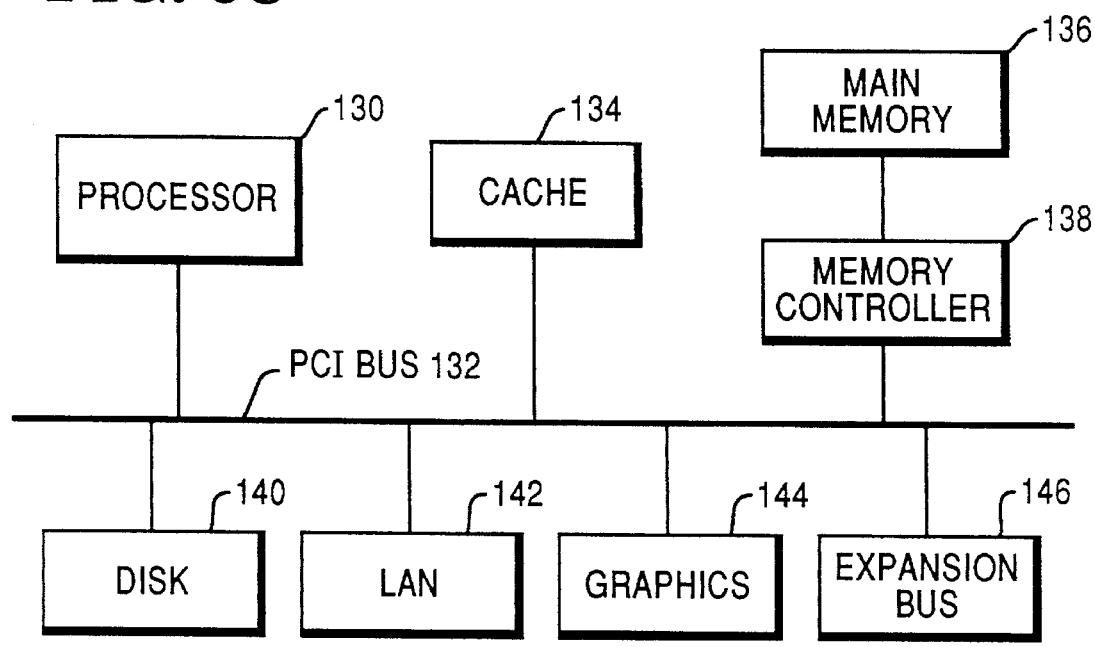

FIGS. 6A–6C illustrate some example architectures using the PCI bus as a main memory bus. Those skilled in the art will recognize that these example configurations are not intended to imply any specific architectural limits.

FIG. 6A depicts a main memory bus architecture with an optional look-aside write-through cache. A processor 92 is coupled to a PCI bus 94 via interface logic 96. The interface logic 96 also couples a cache memory 98 to the PCI bus 94. In addition, a main memory 100 is coupled to the PCI bus 94 via a memory controller 102 which provides access to the main memory 100. Further, a number of different peripherals, e.g., disk 104, LAN interface 106, graphics card 108, and expansion bus 110, are coupled to the PCI bus 94.

FIG. 6B depicts a main memory bus architecture with an optional in-line write-through or write-back cache. A processor 112 is coupled to a PCI bus 114 via an in-line cache memory 116. A main memory 118 is also coupled to the PCI bus 114 via a memory controller 120, which provides access to the main memory 118. In addition, a number of different peripherals, e.g., disk 122, LAN interface 124, graphics card 126, and expansion bus 128, are coupled to the PCI bus 114.

FIG. 6C depicts a main memory bus architecture with an optional look-aside cache. A processor 130 is directly coupled to a PCI bus 132. A cache memory 134 is also directly coupled to the PCI bus 132. In addition, a main memory 136 is also coupled to the PCI bus 132 via a memory controller 138, which provides access to the main memory 136. Further, a number of different peripherals, e.g., disk 140, LAN interface 142, graphics card 144, and expansion bus 146, are coupled to the PCI bus 132.

In all the above configurations, main memory resides directly on the PCI bus, and further, all processor accesses to and from main memory are transmitted over the PCI bus. A single-port processor and the use of the PCI bus as a memory bus eliminates the cost of an unneeded extra concurrent bus in low-throughput I/O applications and thus provides design simplicity and cost effectiveness. Since such low-throughput I/O environments are typically the norm for mainstream PCs and network clients, this approach may likely prove to be a highly desirable way to use the PCI bus in high volume, cost-sensitive products.

Contrast this with the dual-port processor approach depicted in FIG. 5C. Although well-suited for high-throughput I/O applications, this approach is inherently more costly than the single port approach due to the increased pin count (to accommodate both PCI bus and DRAM interfaces) and due to the complex logic (to accommodate integrated memory controllers, bridges, decoders, configuration registers, etc.). As such, the technology barriers to realization of a single-port processor coupled to a PCI bus are significantly lower than those in the way of a dual-port processor.

Cache Support via PCI Bus Protocol

The PCI specification defines a rudimentary protocol defined for cache coherency. This protocol is implemented by two optional signals on the PCI bus labeled SDONE and SBO#. The SDONE and SBO# signals transfer cache status information between a bridge/cache and the memory device targeted by the request.

The SBO# (Snoop Back-Off) signal indicates whether the current memory access may proceed or is required to be retried. If asserted, the access must be backed off and retried.

The SDONE (Snoop Done) signal indicates the status of the snoop for the current access. In a write-back cache environment, it is used in conjunction with the SBO# signal to indicate the status and result of the snoop. When de-asserted it indicates the result of the snoop is still pending. When asserted it indicates the snoop is complete, and the transaction may be resolved, as qualified by the SBO# signal:

| SDONE | SBO# | Status |
|---|---|---|
| 0 | 1 | Standby; snoop results pending. |
| 0 | 0 | Busy; back off access, retry access later. |
| 1 | 1 | Clean Snoop; access proceeds normally. |
| 1 | 0 | Hit-Modified; back off access. |

The Standby status indicates that the snooping device is in the process of determining the action required by the target device. The target device claims the transaction by identifying itself as the selected device and then inserts wait states until the snooping device indicates a Busy, Clean Snoop or Hit-Modified status. The impact on bus latency caused by these wait states must be carefully considered.

The Busy status indicates that the snooping device is unable to perform the snoop at the current time. The target device of the memory access is required to signal a retry to back off the access attempt.

The Clean Snoop status indicates that there is no cache conflict and that the memory access may be completed normally. This implies there was no hit or that there was a hit to an unmodified line.

The Hit-Modified status indicates the snoop hit a modified line in the cache. The target device is required to signal a retry to back off the access, allowing the bridge/cache to write the modified line back to memory. When the access is thereafter retried, it should receive a Clean Snoop status.

Using the SDONE and SBO# signals, the bridge/cache snoops all memory accesses on the PCI bus, and determines what response is required by the target device to ensure memory coherency. To avoid a "snooping overload," the bridge/cache may be programmed to signal a Clean Snoop immediately on frequently accessed address ranges which are configured as non-cache-able.

Any device that is cache-able must monitor the SDONE and SBO# signals and respond appropriately when selected as the target device. Any device that is non-cache-able may ignore the SDONE and SBO# signals.

Since the PCI specification allows bursts of unlimited length, the target device of the request must retry any access that attempts to cross a cache line boundary. This means that any cache-able target device must be aware of the cache line size by implementing a cache line size register or other means. If a burst is allowed to cross a cache line boundary, cache coherency will "break" unless the bridge/cache has monitored the transaction and generated the next cache line address for snooping.

Cache Coherency via Sideband Signals

Cache coherency can also be managed by sideband signals that replace or supplement the protocol defined for the PCI bus.

Write-Through Cache

Figure 7:
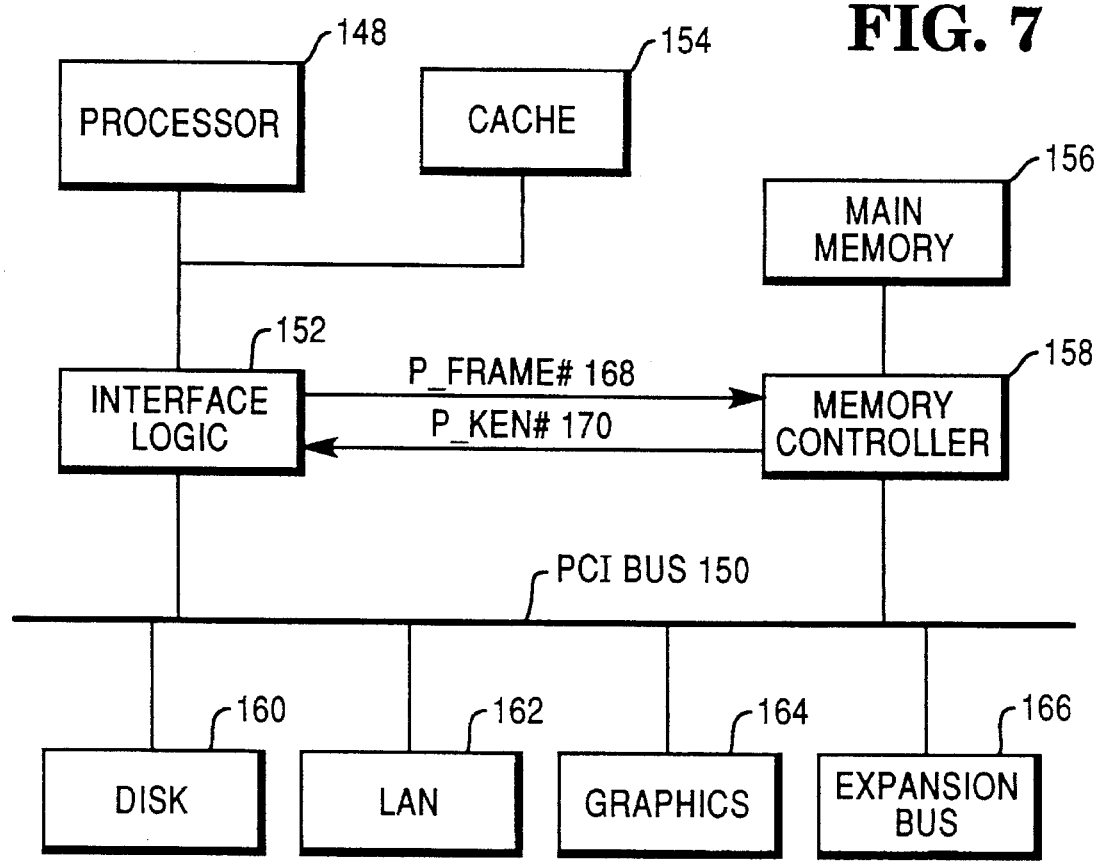
FIG. 7 depicts a main memory bus architecture with an optional look-aside write-through cache.

FIG. 7 depicts a main memory bus architecture with an optional look-aside write-through cache. A processor 148 is coupled to a PCI bus 150 via interface logic 152. The interface logic 152 also couples a cache memory 154 to the PCI bus 150. In addition, a main memory 156 is coupled to the PCI bus 150 via a memory controller 158, which provides access to the main memory 156. Further, a number of different peripherals, e.g., disk 160, LAN interface 162, graphics card 164, and expansion bus 166, are coupled to the PCI bus 150.

Two sideband signals 168 and 170 allow the processor 148 to cache the main memory 156 coupled to the PCI bus 150 in write-through mode. These signals 168 and 170 are a private processor-to-memory signal (P_FRAME# 168) indicating a cache line request by the processor 148, and memory-to-processor signal (P_KEN# 170) indicating a cache-able memory range in response to the cache line request.

Write-Back Cache

Figure 8:
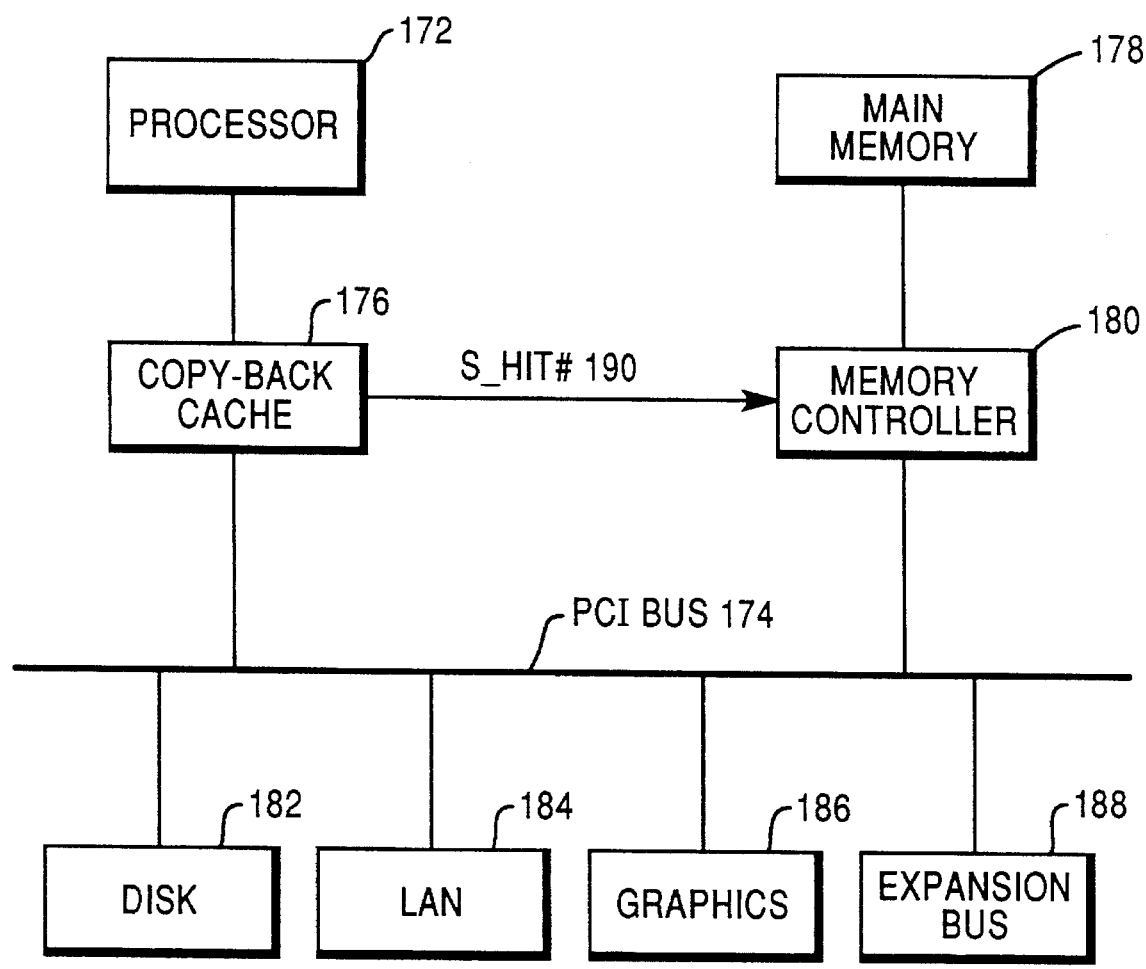
FIG. 8 depicts a main memory bus architecture with an optional in-line copy-back cache.

FIG. 8 depicts a main memory bus architecture with an optional in-line copy-back cache. A processor 172 is coupled to a PCI bus 174 via an in-line cache memory 176. A main memory 178 is also coupled to the PCI bus 174 via a memory controller 180, which provides access to the main memory 178. In addition, a number of different peripherals, e.g., disk 182, LAN interface 184, graphics card 186, and expansion bus 188, are coupled to the PCI bus 174.

In FIG. 8, the processor 172 can cache the main memory 178 in write-back mode. This requires an additional processor-to-memory S_HIT# (Snoop Hit) signal 190. Signals like those previously described for write-through operation may also be required, depending on the specific processor and coherency protocol used.

Figure 9:
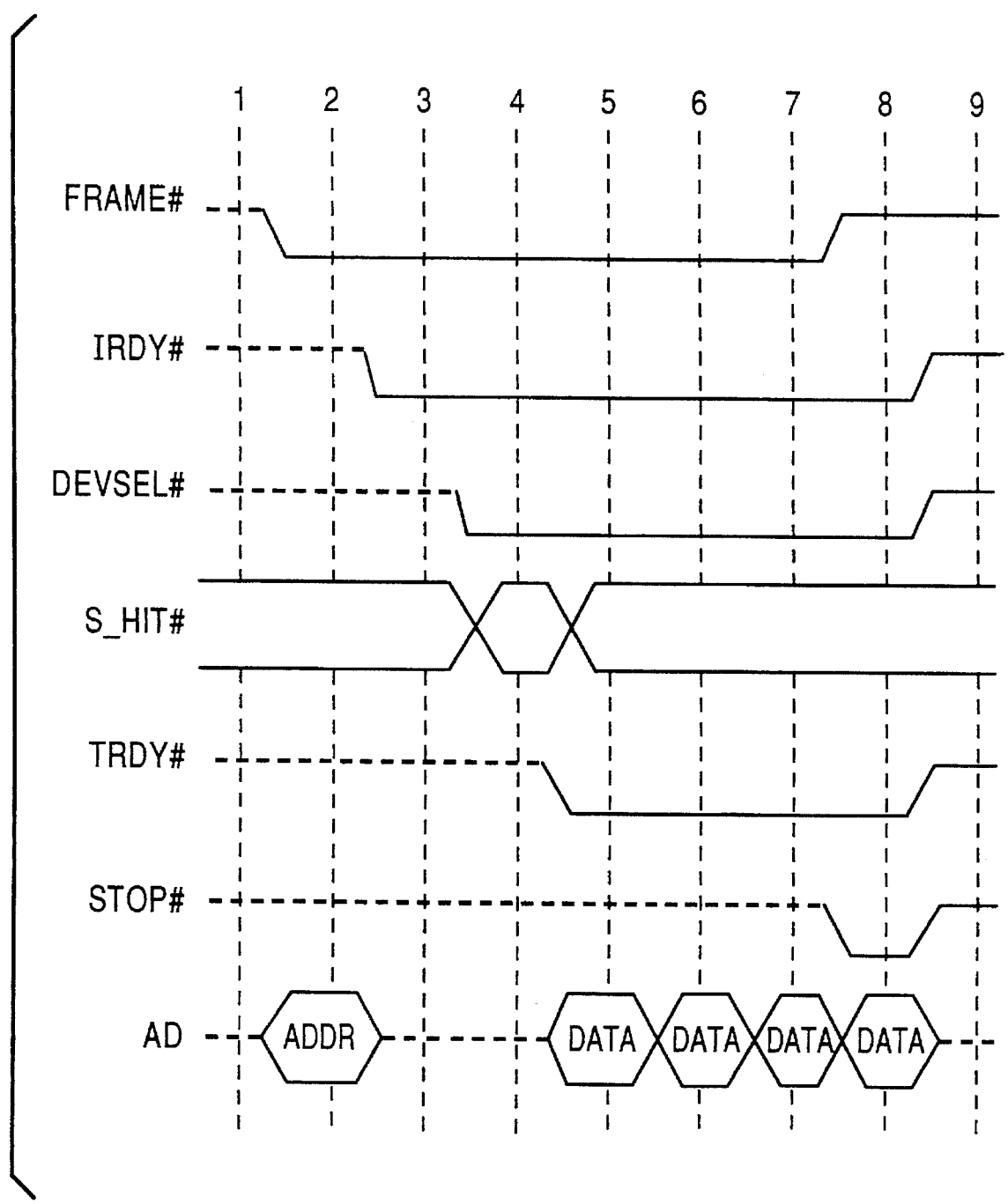
FIG. 9 is a timing diagram illustrating how a processor "snoops" all non-processor initiated read and write transactions to main memory for write-back operations.

FIG. 9 is a timing diagram illustrating how the processor "snoops" all non-processor-initiated read and write transactions to the memory devices for write-back operations. After bus access has been granted to a master device, the FRAME# signal is asserted in the first clock period by the master device to indicate the beginning of the transaction.

The first clock edge on which the FRAME# signal is asserted is the address phase, and the AD signals identify the address of the memory and the C/BE# signals (not shown) indicate a read transaction. For more information on the address and bus command codes, refer to the document *Peripheral Component Interconnect (PCI), Revision 1.0 Specification*, Jun. 22, 1992, incorporated by reference herein.

At the next clock edge, the memory responds normally by asserting its DEVSEL# signal, but defers enabling its TRDY#, AD[31::0], and STOP# output buffers. The memory waits some predetermined number of clock periods, so that there is enough time for the processor (or other cache control agent) to determine whether the addressed line is owned or modified in the cache.

The memory also samples the S-HIT# (Snoop Hit) signal before supplying data to the requestor. If the "Snoop Hit" signal indicates a miss, then the memory device will complete the data phase of the transaction by supplying data to the requestor. If the "Snoop Hit" signal indicates a hit, then the cache will complete the data phase of the transaction by supplying data to the requestor, and thus assumes ownership of the TRDY#, AD[31::0], and STOP# signals.

The first of one or more data phases, during which data is transferred by the AD signals from the memory or cache to the master device, begins on the next clock edge for which both the IRDY# and TRDY# signals are asserted by the master device and the memory or cache, respectively. Wait cycles may be inserted in a data phase by either the master device or the memory or cache with the IRDY# and TRDY# signals. The memory or cache can also drive the STOP# signal low to for the access to break on a cache line boundary if necessary.

At such time as the master device intends to complete only one more data transfer (which could be immediately after the address phase), the FRAME# signal is de-asserted and the IRDY# signal is asserted indicating the master device is ready. After the target device indicates the final data transfer, by asserting the TRDY# signal, the interface returns to the idle state with both the FRAME# and IRDY# signals de-asserted.

For write transactions, the cache merely samples both the address and data signals transmitted to the memory, and if "snoop hit" occurs, it updates its local copy with the new data. Alternatively, if the cache is incapable of updating its local copy, one or more additional sideband signals may be necessary to support a castout/merge operation, i.e., the modified line must be retrieved from the cache, overlaid with any new bytes supplied by the master device, and once old and new bytes are merged, written to the memory.

Look-Aside Cache

Figure 10:
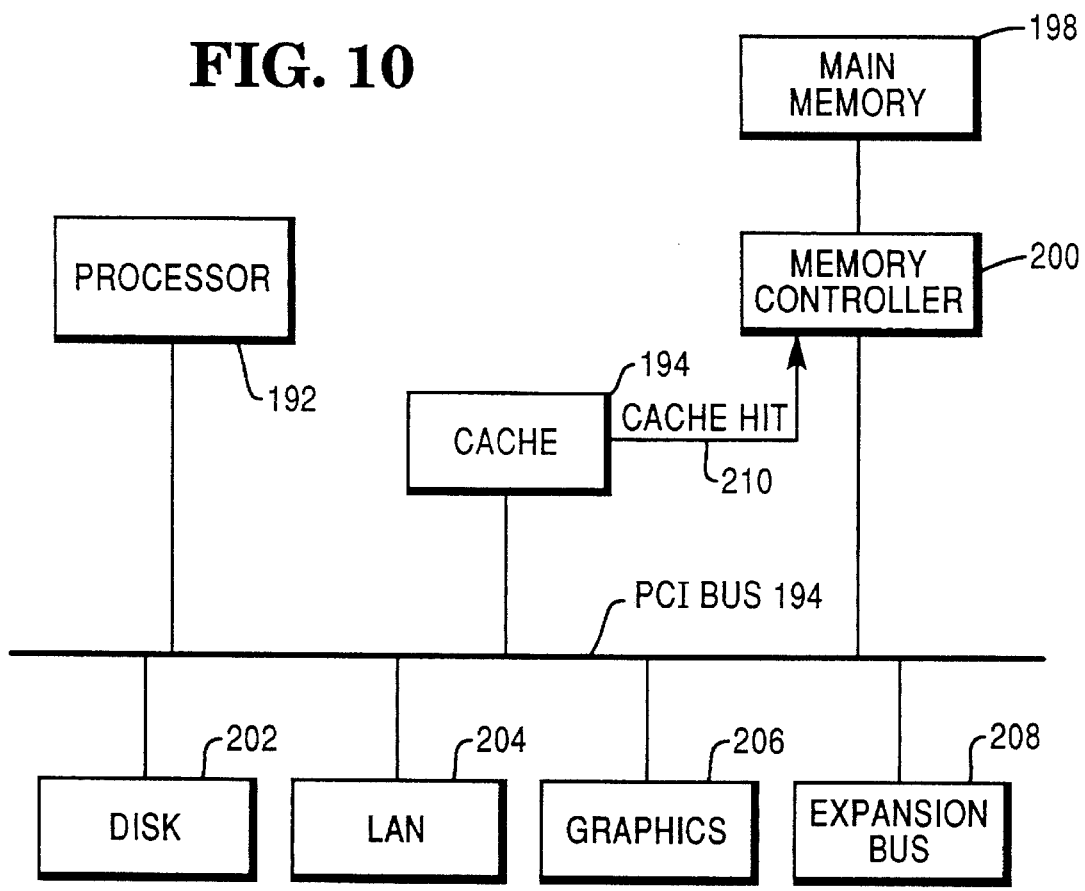
FIG. 10 depicts a main memory bus architecture with a write-through look-aside cache that is coupled to a PCI bus, wherein a read cache miss is serviced from main memory.

FIG. 10 depicts a main memory bus architecture with a write-through look-aside cache that is coupled to a PCI bus, wherein a read cache miss is serviced from main memory. A processor 192 is directly coupled to a PCI bus 194. A cache memory 196 is also directly coupled to the PCI bus 194. In addition, a main memory 198 is also coupled to the PCI bus 194 via a memory controller 200, which provides access to the main memory 198. Further, a number of different peripherals, e.g., disk 202, LAN interface 204, graphics card 206, and expansion bus 208, are coupled to the PCI bus 194.

In FIG. 10, as data is returned to the processor 192 on the PCI bus 194, it is fed in parallel to the cache 196. A subsequent access to the same line will result in a cache hit, which is serviced from the cache 196 instead of the main memory 198. Since both the cache 196 and memory controller 200 see all reads initiated by the processor 192, the cache 196 must inform the memory controller 200 via signal 210 when it detects a hit, so that the memory controller 200 can suppress its response. Thus, the cache 196 effectively substitutes itself as the target device for read hits. Since the cache 196 is write-through, all writes by the processor 192 update the main memory 198. In addition, writes that also hit the cache 196, update the main memory 198 as well. Both the processor 192 (if it has on-board cache) and the cache 196 snoop writes not initiated by the processor 192 to insure coherency.

In-Line Cache

Figure 11:
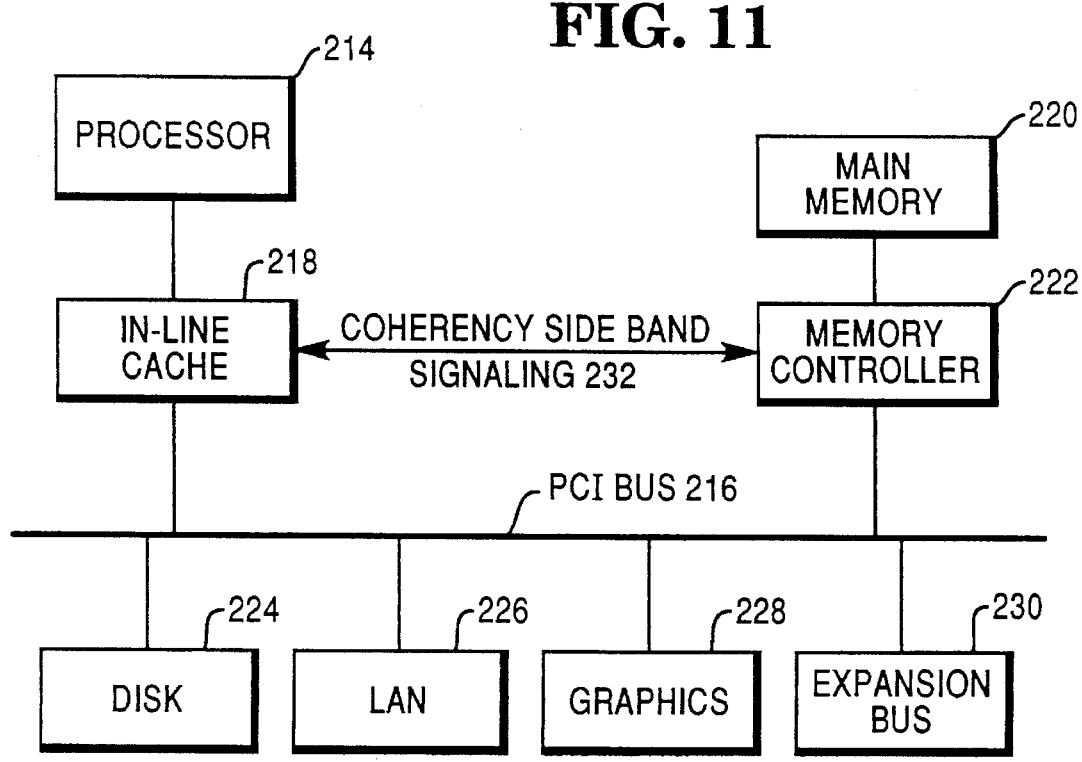
FIG. 11 depicts a main memory bus architecture with an optional in-line cache.

FIG. 11 depicts a main memory bus architecture with an optional in-line cache. A processor 214 is coupled to a PCI bus 216 via an in-line cache memory 218. A main memory 220 is also coupled to the PCI bus 216 via a memory controller 222, which provides access to the main memory 220. In addition, a number of different peripherals, e.g., disk 224, LAN interface 226, graphics card 228, and expansion bus 230, are coupled to the PCI bus 216. Since the cache 218 is in-line, as compared to look-aside, it is readily adaptable to either write-through or write-back coherency protocols via coherency sideband signalling lines 232.

In an in-line arrangement, a cache hit is serviced directly without having to propagate the access to the PCI bus 216. The benefits of this technique are twofold: (1) cache hits are serviced quicker; and (2) cache hits are filtered from the traffic presented to the PCI bus 216, thereby reducing bus 216 utilization. Unlike a look-aside cache, an in-line cache 218 typically adds a level of concurrency in that cache hits can occur in parallel with the peer-to-peer I/O activity on the bus 216, or in parallel with the master device activity to and from the main memory 220.

A copy-back in-line cache 218 has additional advantages. By reducing the bandwidth requirements of the main memory 220 on the bus 216, a copy-back cache 218 extends the range of processors 214 that can be adequately satisfied with the main memory 220 coupled to the PCI bus 216. Also, by reducing demand for access to the PCI bus 216, more bandwidth is available for concurrent I/O.

CONCLUSION

In summary, a Peripheral Component Interconnect (PCI) bus has been described for component level interconnection of processors, peripherals and memories. This interconnect lends itself to concurrent architectures using the PCI bus for peer-to-peer I/O operations, as well as the use of the PCI bus as a main memory bus. The PCI bus includes a protocol that guarantees that at all times, except for turn-around clocks necessary to prevent contention, that the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

The foregoing description of the preferred embodiment of the present invention has been presented only for the purposes of illustration and description. The foregoing description is not intended to be exhaustive or to limit the invention to the precise form disclosed. Many modifications and variations are possible in light of the teaching herein. For example, the following paragraphs describe some alternatives in accomplishing the same invention.

Those skilled in the art will recognize that the present invention is applicable to systems with different configurations of devices and components. The example configurations of devices and components cited in the present specification are for illustrative purposes only and are not intended to be exhaustive or to limit the invention to the precise form disclosed.

Those skilled in the art will recognize that the present invention is applicable to buses with different pin counts and different signal definitions. The pin counts and signal definitions cited in the present specification are for illustrative purposes only and are not intended to be exhaustive or to limit the invention to the precise form disclosed.

Those skilled in the art will recognize that the present invention is applicable to buses with different electrical characteristics. The electrical characteristics cited in the present specification are for illustrative purposes only and are not intended to be exhaustive or to limit the invention to the precise form disclosed.

Those skilled in the art will recognize that the present invention is applicable to buses with different transaction types, including transactions with different functional sequences. The transactions cited in the present specification are for illustrative purposes only and are not intended to be exhaustive or to limit the invention to the precise form disclosed.

It is intended that the scope of the invention be limited not by this detailed description, but rather by the claims appended hereto.

What is claimed is:

1. A computer system, comprising:

(a) a processor;

(b) a main memory;

(c) a cache memory;

(d) a bus comprising a plurality of electrically conductive signal connections, coupled between the processor, main memory, cache memory, and one or more electronic devices, for communicating electrical signals therebetween, the bus further comprising one or more cache snooping signal connections, coupled to the cache memory and the main memory, for communicating electrical signals therebetween comprising cache status information, wherein the cache memory snoops all accesses to the main memory on the bus via the cache snooping signals, and determines what response is required to ensure memory coherency; and (e) a central arbiter device, coupled to the processor, the main memory, the cache memory, and the electronic devices, for selecting by arbitration a first agent, coupled to the bus and selected from a group comprising the processor, the main memory, the cache memory, and the electronic devices, for actively and exclusively driving a specific electrically conductive signal connection of the bus to a logic 1 or 0 value during a first time period, and for selecting by arbitration a second agent, coupled to the bus and selected from a group comprising the processor, the main memory, the cache memory, and the electronic devices, for actively and exclusively driving the specific electrically conductive signal connection of the bus to a logic 1 or 0 value during a second time period following the first time period, so that the specific electrical conductive signal connection of the bus is never left floating for an extended period of time, wherein a turnaround time period exists between the first and second time periods to prevent contention between the first and second agents for the electrically conductive signal connection, each agent that requests exclusive control of the bus having a request signal line and grant signal line connected to the central arbiter device, the request signal line indicating to the central bus arbiter that the agent desires use of the bus, and the grant signal line indicating to the agent that access to the bus has been granted by the central arbiter device, wherein the central arbiter agent further comprises arbitration parking means for asserting the grant signal line to a selected agent not requesting access to the bus when no other agent is requesting access to the bus, thereby effectively designating the selected agent as a default owner of the bus, so that the bus will not float.

2. The system as set forth in claim 1 above, wherein the cache memory is a look-aside cache memory.

3. The system as set forth in claim 1 above, wherein the cache memory is an in-line cache memory.

4. The system as set forth in claim 1 above, wherein the electrically conductive signal connections comprise a plurality of signal lines for device addressing, data transfer, bus control, bus arbitration, and system functions.

5. A computer system, comprising:
   (a) a processor;
   (b) a main memory;
   (c) a cache memory;
   (d) a bus comprising a plurality of electrically conductive signal connections, coupled between the processor, main memory, cache memory, and one or more electronic devices, for communicating electrical signals therebetween;
   (e) one or more cache snooping signal connections, coupled to the cache memory and the main memory, for communicating electrical signals therebetween comprising cache status information, wherein the cache memory snoops all accesses to the main memory on the bus via the cache snooping signals, and determines what response is required to ensure memory coherency; and
   (f) a central arbiter device, coupled to the processor, the main memory, the cache memory and the electronic devices, for selecting by arbitration a first agent, coupled to the bus and selected from a group comprising the processor, the main memory, the cache memory, and the electronic devices, for actively and exclusively driving a specific electrically conductive signal connection of the bus to a logic 1 or 0 value during a first time period, and for selecting by arbitration a second agent, coupled to the bus and selected from a group comprising the processor, the main memory, the cache memory, and the electronic devices, for actively and exclusively driving the specific electrically conductive signal connection of the bus to a logic 1 or 0 value during a second time period following the first time period, so that the specific electrical conductive signal connection of the bus is never left floating for an extended period of time, wherein a turnaround time period exists between the first and second time periods to prevent contention between the first and second agents for the electrically conductive signal connection, each agent that requests exclusive control of the bus having a request signal line and grant signal line connected to the central arbiter device, the request signal line indicating to the central bus arbiter that the agent desires use of the bus, and the grant signal line indicating to the agent that access to the bus has been granted by the central arbiter device, wherein the central arbiter device further comprises arbitration parking means for asserting the grant signal line to a selected agent not requesting access to the bus when no other agent is requesting access to the bus, thereby effectively designating the selected agent as a default owner of the bus, so that the bus will not float.

6. The system as set forth in claim 5 above, wherein the cache memory is a look-aside cache memory.

7. The system as set forth in claim 5 above, wherein the cache memory is an in-line cache memory.

8. The system as set forth in claim 5 above, wherein the electrically conductive signal connections comprise a plurality of signal lines for device addressing, data transfer, bus control, bus arbitration, and system functions.

9. A computer system, comprising:
   (a) a first bus comprising a plurality of first electrically conductive signal connections, coupled between one or more first electronic devices, for communicating electrical signals therebetween;
   (b) a second bus comprising a plurality of second electrically conductive signal connections, coupled between one or more second electronic devices, for communicating electrical signals therebetween, wherein one or more of the second electronic devices actively and exclusively drives one or more of the second electrically conductive signal connections to a logic 1 or 0 value, so that the electrical signals communicated thereby are never left floating;
   (c) one or more bridge interfaces, coupled to the first and second buses, for communicating electrical signals between the first electronic devices and the second electronic devices; and
   (d) a central arbiter device, coupled to the second electronic devices, for selecting by arbitration a first agent, coupled to the second bus and selected from a group comprising the bridge interfaces and the second electronic devices, for actively and exclusively driving a specific electrically conductive signal connection of the second bus to a logic 1 or 0 value during a first time period, and for selecting by arbitration a second agent, coupled to the second bus and selected from a group comprising the bridge interfaces and the second electronic devices, for actively and exclusively driving the specific electrically conductive signal connection of the second bus to a logic 1 or 0 value during a second time period following the first time period, so that the specific electrical conductive signal connection of the second bus is never left floating for an extended period of time, wherein a turnaround time period exists between the first and second time periods to prevent contention between the first and second agents for the electrically conductive signal connection, each agent that requests exclusive control of the second bus having a request signal line and grant signal line connected to the central arbiter device, the request signal line indicating to the central bus arbiter that the agent desires use of the second bus, and the grant signal line indicating to the agent that access to the second bus has been granted by the central arbiter device, wherein the central arbiter device further comprises arbitration parking means for asserting the grant signal line to a selected agent not requesting access to the second bus when no other agent is requesting access to the second bus, thereby effectively designating the selected agent as a default owner of the second bus, so that the second bus will not float.

10. The system as set forth in claim 9 above, wherein the second bus is a Peripheral Component Interconnect (PCI) bus.

11. The system as set forth in claim 9 above, wherein the electrically conductive signal connections comprise a plurality of signal lines for device addressing, data transfer, bus control, bus arbitration, and system functions.

12. A computer system, comprising:
(a) one or more processors;
(b) one or more memories;
(c) one or more bridge interfaces, coupled to the processors and the memories, for communicating electrical signals therebetween;
(d) a bus comprising a plurality of electrically conductive signal connections, coupled to the bridge interfaces and one or more electronic devices, for communicating electrical signals therebetween; and
(e) a central arbiter device, coupled to the processors, the memories, the bridge interfaces and the electronic devices, for selecting by arbitration a first agent, coupled to the bus and selected from a group comprising the processors, the memories, the bridge interfaces, and the electronic devices, for actively and exclusively driving a specific electrically conductive signal connection of the bus to a logic 1 or 0 value during a first time period, and for selecting by arbitration a second agent, coupled to the bus and selected from a group comprising the processors, the memories, the bridge interfaces, and the electronic devices, for actively and exclusively driving the specific electrically conductive signal connection of the bus to a logic 1 or 0 value during a second time period following the first time period, so that the specific electrical conductive signal connection of the bus is never left floating for an extended period of time, wherein a turnaround time period exists between the first and second time periods to prevent contention between the first and second agents for the electrically conductive signal connection, each agent that requests exclusive control of the bus having a request signal line and grant signal line connected to the central arbiter device, the request signal line indicating to the central bus arbiter that the agent desires use of the bus, and the grant signal line indicating to the agent that access to the bus has been granted by the central arbiter device, wherein the central arbiter device further comprises arbitration parking means for asserting the grant signal line to a selected agent not requesting access to the bus when no other agent is requesting access to the bus, thereby effectively designating the selected agent as a default owner of the bus, so that the bus will not float.

13. The system as set forth in claim 12 above, wherein the bus is a Peripheral Component Interconnect (PCI) bus.

14. The system as set forth in claim 12 above, wherein the electrically conductive signal connections comprise a plurality of signal lines for device addressing, data transfer, bus control, bus arbitration, and system functions.

15. A computer system, comprising:
(a) one or more processors;
(b) one or more memories;
(c) one or more first interfaces, coupled to the processors and the memories, for communicating electrical signals therebetween;
(d) a bus comprising a plurality of electrically conductive signal connections, coupled to one or more electronic devices;
(e) one or more second interfaces, coupled to the processors and the bus, for communicating electrical signals therebetween;
(f) one or more third interfaces, coupled to the memories and the bus, for communicating electrical signals therebetween; and
(g) a central arbiter device, coupled to the processors, the memories, the second interfaces, the third interfaces and the electronic devices, for selecting by arbitration a first agent, coupled to the bus and selected from a group comprising the processors, the memories, the second and third interfaces, and the electronic devices, for actively and exclusively driving a specific electrically conductive signal connection of the bus to a logic 1 or 0 value during a first time period, and for selecting by arbitration a second agent, coupled to the bus and selected from a group comprising the processors, the memories, the second and third interfaces, and the electronic devices, for actively and exclusively driving the specific electrically conductive signal connection of the bus to a logic 1 or 0 value during a second time period following the first time period, so that the specific electrical conductive signal connection of the bus is never left floating for an extended period of time, wherein a turnaround time period exists between the first and second time periods to prevent contention between the first and second agents for the electrically conductive signal connection, each agent that requests exclusive control of the bus having a request signal line and grant signal line connected to the central arbiter device, the request signal line indicating to the central bus arbiter that the agent desires use of the bus, and the grant signal line indicating to the agent that access to the bus has been granted by the central arbiter device, wherein the central arbiter device further comprises arbitration parking means for asserting the grant signal line to a selected agent not requesting access to the bus when no other agent is requesting access to the bus, thereby effectively designating the selected agent as a default owner of the bus, so that the bus will not float.

16. The system as set forth in claim 15 above, wherein the electrically conductive signal connections comprise a plurality of signal lines for device addressing, data transfer, bus control, bus arbitration, and system functions.

* * * * *